(12) United States Patent
Han

(10) Patent No.: US 10,795,424 B2
(45) Date of Patent: Oct. 6, 2020

(54) SERVER POWER SAVING SYSTEM AND SERVER POWER SAVING METHOD

(71) Applicants: INVENTEC (PUDONG) TECHNOLOGY CORPORATION, Shanghai (CN); INVENTEC CORPORATION, Taipei (TW)

(72) Inventor: Ying-Xian Han, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 162 days.

(21) Appl. No.: 16/135,719

(22) Filed: Sep. 19, 2018

(65) Prior Publication Data

US 2020/0057482 A1 Feb. 20, 2020

(30) Foreign Application Priority Data

Aug. 15, 2018 (CN) .......................... 2018 1 0931227

(51) Int. Cl.
*G06F 1/26* (2006.01)
*G06F 1/3221* (2019.01)
*G06F 1/3237* (2019.01)
*G06F 1/3203* (2019.01)

(52) U.S. Cl.
CPC .......... *G06F 1/3221* (2013.01); *G06F 1/3237* (2013.01); *G06F 1/3203* (2013.01)

(58) Field of Classification Search
CPC .............................. G06F 1/3221; G06F 1/3237

USPC ........................................................ 713/320
See application file for complete search history.

(56) References Cited

U.S. PATENT DOCUMENTS

| | | | | |
|---|---|---|---|---|
| 2006/0136643 | A1* | 6/2006 | Lin | G06F 1/12 710/302 |
| 2008/0086589 | A1* | 4/2008 | Urabe | G06F 13/1668 711/103 |
| 2008/0270776 | A1* | 10/2008 | Totolos | G06F 11/1441 713/1 |
| 2008/0307239 | A1* | 12/2008 | Watanabe | G06F 1/3203 713/310 |
| 2009/0225618 | A1* | 9/2009 | Ko | G11C 5/02 365/226 |
| 2009/0259837 | A1* | 10/2009 | Wu | G06F 11/1456 713/2 |

(Continued)

*Primary Examiner* — Volvick Derose
(74) *Attorney, Agent, or Firm* — Maschoff Brennan

(57) ABSTRACT

A server power saving system includes a motherboard and a backplane. The motherboard includes a CPLD, a basic I/O control chip electrically connected with the CPLD, and a clock chip electrically connected with the CPLD. The basic I/O control chip includes a basic I/O control program The backplane includes a HD microcontroller electrically connected with the CPLD and a HD connection port electrically connected with the HD microcontroller and the clock chip. The HD microcontroller sends clock enable signal to the CPLD when a HD is electrically connected with the HD connection port. The CPLD transmits clock enable signal to the basic I/O control chip. The basic I/O control chip sends confirmation signal to the CPLD according to clock enable signal, and the CPLD determines whether to drive the clock chip to send clock signal to the HD connection port according to a content of confirmation signal.

10 Claims, 6 Drawing Sheets

(56) References Cited

U.S. PATENT DOCUMENTS

2016/0042763 A1\* 2/2016 Estell ................. G11B 20/1816
714/718

\* cited by examiner

SERVER POWER SAVING SYSTEM AND SERVER POWER SAVING METHOD

CROSS-REFERENCE TO RELATED APPLICATIONS

This non-provisional application claims priority under 35 U.S.C. § 119(a) on Patent Application No(s). 201810931227.6 filed in China on Aug. 15, 2018, the entire contents of which are hereby incorporated by reference.

TECHNICAL FIELD

The present disclosure provides a power saving system and a power saving method, more particularly to a server power saving system and a method of the same.

BACKGROUND

Solid state disks (SSD) are emerging electronic products which are operated by FLASH wafer granules. In a single SSA, the cost of the FLASH wafer granule accounts for about 80% of the SSD. A main difference between the SSD and a traditional mechanical hard disk is that the SSD does not include mechanical parts such as motor, magnetic head and disc; thus, the SSD features high read/write speed and short reaction time. The SSD has the advantages of high speed, low noise, low power consumption, anti-collision, low weight and small size. At present, the capacity of a mainstream SSD is 128 G, but its price is higher than the traditional mechanical hard disk with the same capacity. As the FLASH process is continuously improved, the manufacturing cost of the SSD is gradually reduced. Therefore, the applications of SSD have become more extensive.

SUMMARY

According to one aspect of the disclosure, a server power saving system includes a motherboard and a backplane. The motherboard includes a complex programmable logic device (CPLD), a basic input/output (I/O) control chip and a clock chip. The basic I/O control chip is electrically connected with the CPLD, and the basic I/O control chip includes a basic I/O control program The clock chip is electrically connected with the CPLD. The backplane includes a hard disk microcontroller and a hard disk connection port. The hard disk microcontroller is electrically connected with the CPLD. The hard disk connection port is electrically connected with the hard disk microcontroller and the clock chip. The hard disk microcontroller sends a clock enable signal to the CPLD when a hard disk is electrically connected with the hard disk connection port. The CPLD transmits the clock enable signal to the basic I/O control chip. The basic I/O control chip sends a confirmation signal to the CPLD according to the clock enable signal, and the CPLD determines whether to drive the clock chip to send a clock signal to the hard disk connection port according to a content of the confirmation signal.

BRIEF DESCRIPTION OF THE DRAWINGS

The present invention will become more understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
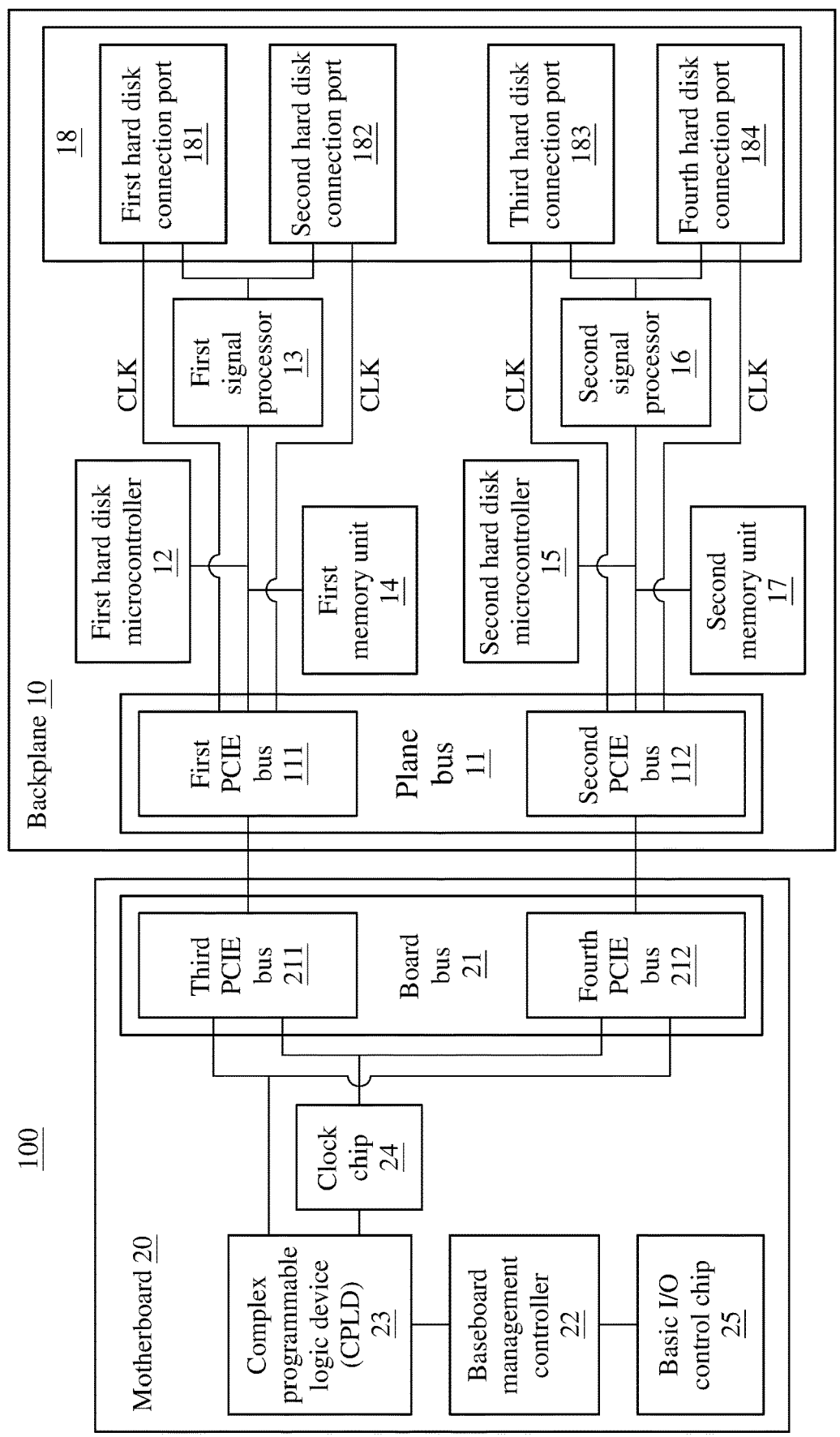
FIG. 1 is a schematic view of a server power saving system according to a first embodiment of the present disclosure.

FIG. 1 is a schematic view of a server power saving system according to a first embodiment of the present disclosure. In this embodiment, a server power saving system 100 includes a backplane 10 and a motherboard 20. The backplane 10 includes a plane bus containing one or more expansion buses in PCI Express (PCIE) standard. In FIG. 1, the backplane 10 includes a plane bus 11 containing a first PCIE bus 111 and a second PCIE bus 112. Both the first PCIE bus 111 and the second PCIE bus 112 of the backplane 10 are configured to receive a first inter-integrated circuit (I2C) signal, a second I2C signal and a clock signal (CLK) from the motherboard 20. In this embodiment, the PCIE bus is a PCIE x8 slot.

As shown in FIG. 1, the backplane 10 includes a first hard disk microcontroller 12, a first signal processor 13, a first memory unit 14, a second hard disk microcontroller 15, a second signal processor 16, a second memory unit 17 and a connection port set 18. In this embodiment, the first hard disk microcontroller 12 is a PIC controller electrically and respectively connected with the first PCIE bus 111, the first signal processor 13 and the first memory unit 14, and the first hard disk microcontroller 12 is configured to generate a clock enable signal. In addition to the electrical connection with the first hard disk microcontroller 12, the first signal processor 13 is also electrically and respectively connected with the first PCIE bus 111, the first memory unit 14 and the connection port set 18. The first signal processor 13 is configured to process the first I2C signal and the second I2C signal. The first I2C signal controls a RST instruction of the first hard disk microcontroller 12, and the second I2C signal controls a lighting instruction and decoding of I2C signals. In this embodiment, the first memory unit 14 is a non-volatile random access memory (NVRAM) configured for temporary storage and management of the information in both the first I2C signal and the second I2C signal which are transmitted from the motherboard 20. In addition to the electrical connection with the first hard disk microcontroller 12 and the first signal processor 13, the first memory unit 14 is also electrically connected with the first PCIE bus 111.

The second hard disk microcontroller 15 is a PIC controller electrically and respectively connected with the second PCIE bus 112, the second signal processor 16 and the second memory unit 17. The second hard disk microcontroller 15 is configured to generate a clock enable signal. In addition to the electrical connection with the second hard disk microcontroller 15, the second signal processor 16 is also electrically connected and respectively with the second PCIE bus 112, the second memory unit 17 and the connection port set 18. The second signal processor 16 is configured to process the first I2C signal and the second I2C signal. In this embodiment, the second memory unit 17 is a NVRAM configured for temporary storage and management of the information in both the first I2C signal and the second I2C signal which are transmitted from the motherboard 20. In addition to the electrical connection with the second hard disk microcontroller 15 and the second signal processor 16, the second memory unit 17 is also electrically connected with the second PCIE bus 112.

The connection port set 18 includes a first connection port 181, a second connection port 182, a third connection port 183 and a fourth connection port 184. Both the first connection port 181 and the second connection port 182 are electrically connected with the first signal processor 13, and both the third connection port 183 and the fourth connection port 184 are electrically connected with the second signal processor 16.

Figure 2:
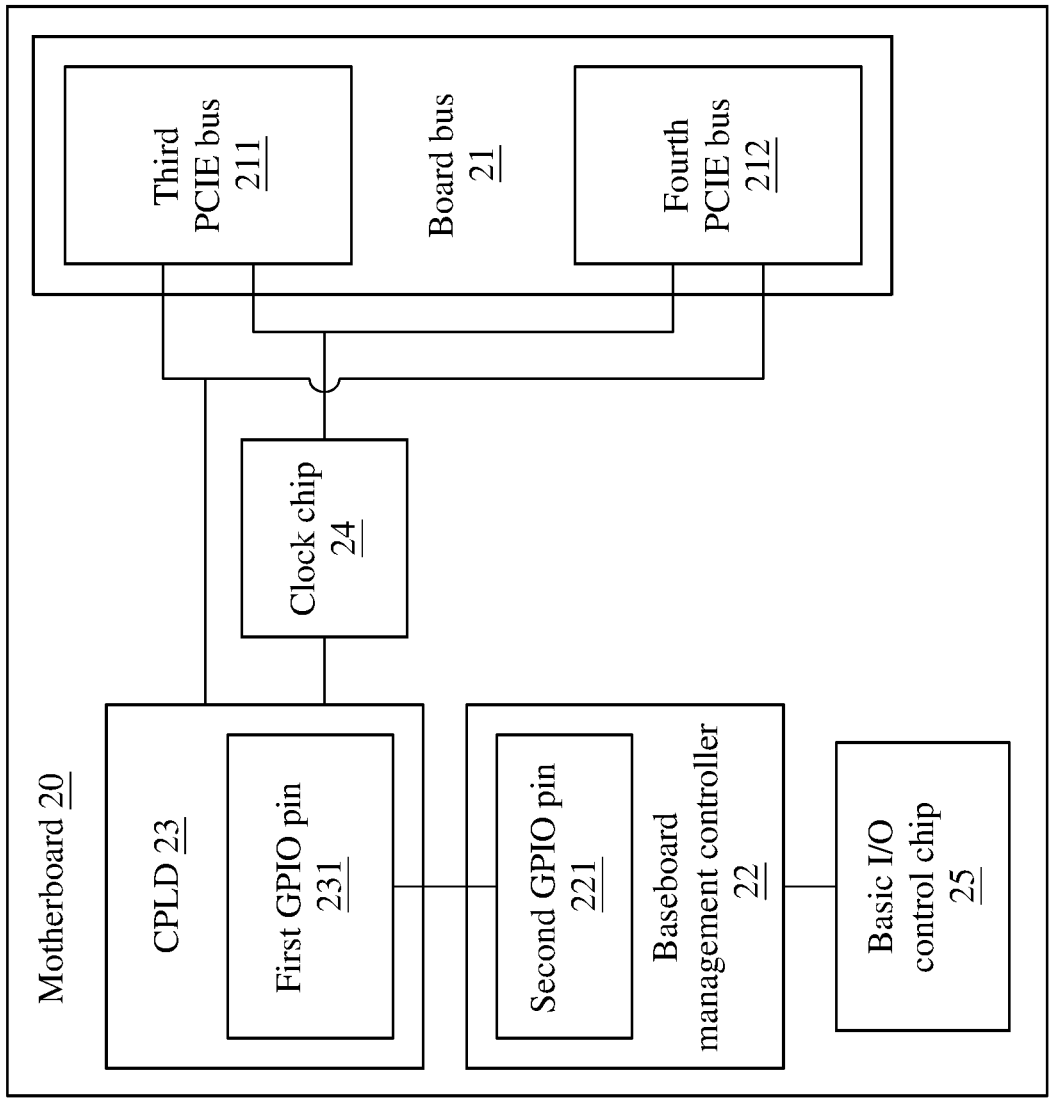
FIG. 2 is a schematic view of a motherboard of the server power saving system in FIG. 1.

Please further refer to FIG. 2. FIG. 2 is a schematic view of a motherboard of the server power saving system in FIG. 1. The motherboard 20 includes a board bus containing one or more expansion buses in PCIE standard. In FIG. 1 and FIG. 2, the motherboard 20 includes a board bus 21, a baseboard management controller 22, a complex programmable logic device (CPLD) 23, a clock chip 24, a basic input/output (I/O) control chip 25 and a CPU. The board bus 21 contains a third PCIE bus 211 and a fourth PCIE bus 212. The third PCIE bus 211 of the motherboard 20 is electrically connected with the first PCIE bus 111 of the backplane 10, and the fourth PCIE bus 212 of the motherboard 20 is electrically connected with the second PCIE bus 112 of the backplane 10. The CPLD 23 is electrically and respectively connected with third PCIE bus 211 and the fourth PCIE bus 212. The CPLD 23 includes a first general purpose input/output (GPIO) pin 231, and the baseboard management controller 22 includes a second GPIO pin 221. The first GPIO pin 231 is electrically connected with the second GPIO pin 221. The clock chip 24 is electrically and respectively connected with the CPLD 23, the third PCIE bus 211 and the fourth PCIE bus 212. The basic I/O control chip 25 is electrically and respectively connected with the baseboard management controller 22, and the basic I/O control chip 25 includes basic I/O system (BIOS).

The first I2C signal from the CPU of the motherboard 20 is transmitted to the third PCIE bus 211 and the fourth PCIE bus 212 through the CPLD 23. The third PCIE bus 211 transmits the first I2C signal to the first PCIE bus 111, and the fourth PCIE bus 212 transmits the first I2C signal to the second PCIE bus 112. The first PCIE bus 111 of the backplane 10 transmits the first I2C signal to the first signal processor 13, and the second PCIE bus 112 transmits the first I2C signal to the second signal processor 16. The first I2C signal is further processed by the first signal processor 13 and the second signal processor 16.

The second I2C signal from the baseboard management controller 22 of the motherboard 20 is transmitted to the third PCIE bus 211 and the fourth PCIE bus 212 through the CPLD 23. The third PCIE bus 211 transmits the second I2C signal to the first PCIE bus 111, and the fourth PCIE bus 212 transmits the second I2C signal to the second PCIE bus 112. The first PCIE bus 111 of the backplane 10 transmits the second I2C signal to the first signal processor 13, and the second PCIE bus 112 transmits the second I2C signal to the second signal processor 16. The second I2C signal is further processed by the first signal processor 13 and the second signal processor 16.

The clock signal from the clock chip 24 is transmitted to the first PCIE bus 111 through the third PCIE bus 211, and is transmitted to the second PCIE bus 112 through the fourth PCIE bus 212. The first PCIE bus 111 of the backplane 10 transmits the clock signal to the first connection port 181 and the second connection port 182, and the second PCIE bus 112 transmits the clock signal to the third connection port 183 and the fourth connection port 184.

Figure 3:
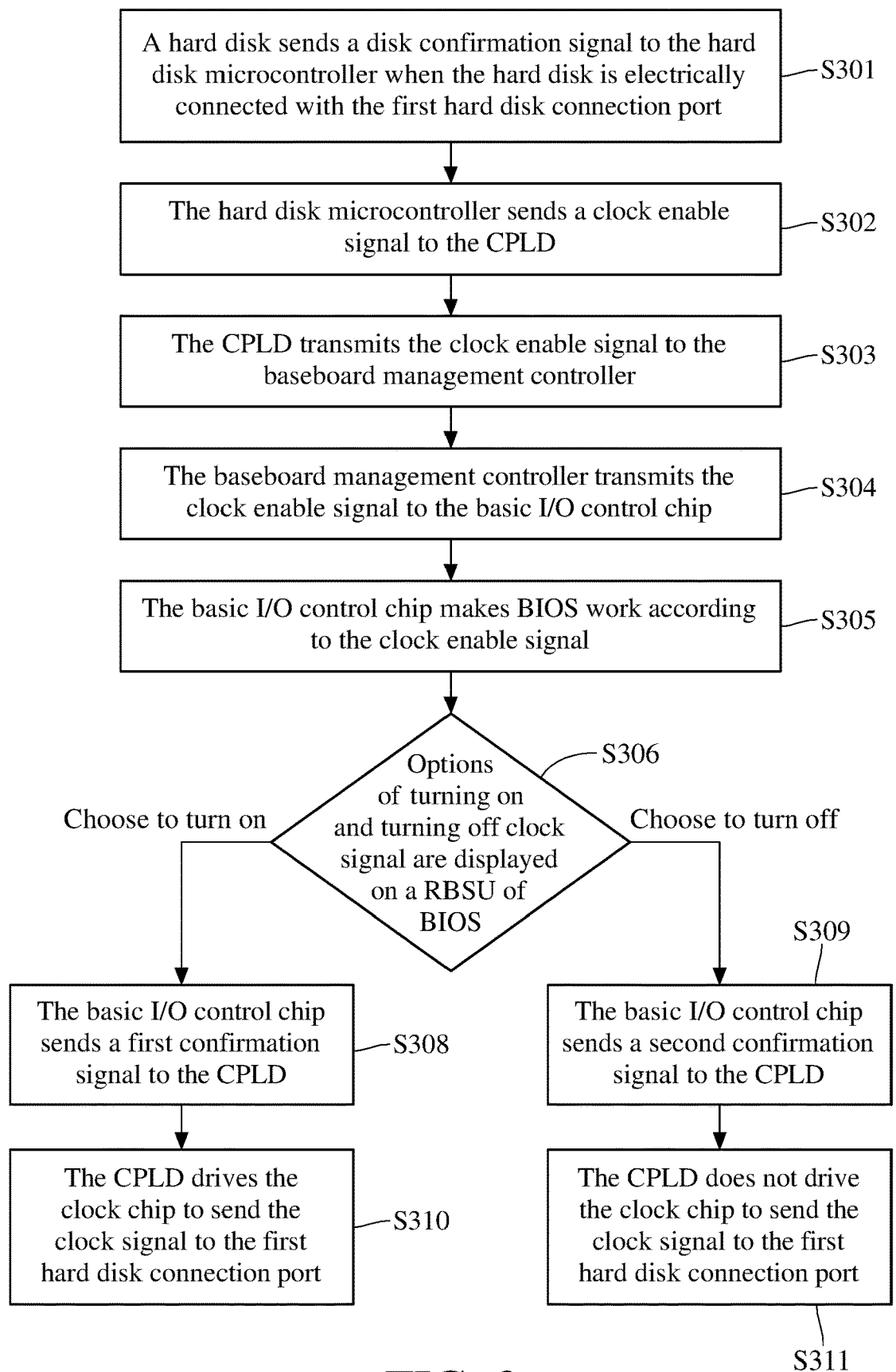
FIG. 3 is a flow chart of a server power saving method performed by the server power saving system in FIG. 1.

FIG. 3 is a flow chart of a server power saving method performed by the server power saving system in FIG. 1. Referring to FIG. 1 through FIG. 3, in a step S301, when a hard disk is electrically connected with the first connection port 181 of the backplane 10, the hard disk sends a disk confirmation signal to the first hard disk microcontroller 12, and the disk confirmation signal indicates that the first connection port 181 of the backplane 10 is electrically connected with the hard disk. In a step S302, the first hard disk microcontroller 12 reads the disk confirmation signal so as to send the clock enable signal to the CPLD 23 of the motherboard 20. The clock enable signal is sent from the backplane 10 to the CPLD 23 through the plane bus 11 and the board bus 21 which are electrically connected with each other. In a step S303, the CPLD 23 transmits the clock enable signal to the baseboard management controller 22 through the first GPIO pin 231 and the second GPIO pin 221. In a step S304, the baseboard management controller 22 transmits the clock enable signal to the basic I/O control chip 25. In a step S305, the basic I/O control chip 25 makes the BIOS work according to the clock enable signal. In a step S306, options of turning on and turning off clock signal are displayed on a rom-based setup utility (RBSU) of the BIOS. A step S308 is performed if a user chooses to turn on clock signal, and a step S309 is performed if the user chooses to turn off clock signal.

In the step S308, the basic I/O control chip 25 sends a first confirmation signal to the CPLD 23. Then, in a step S310, the CPLD 23 drives the clock chip 24 to send the clock signal to the first connection port 181 according to the first confirmation signal.

In the step S309, the basic I/O control chip 25 sends a second confirmation signal to the CPLD 23. Then, in a step S311, the CPLD 23 does not drive the clock chip 24 to send the clock signal to the first connection port 181 according to the second confirmation signal.

Furthermore, in another embodiment, when a hard disk is electrically connected with the second connection port 182 of the backplane 10, the had disk sends a disk confirmation signal to the first hard disk microcontroller 12 of the backplane 10, and the disk confirmation signal indicates that the second connection port 182 of the backplane 10 is electrically connected with the hard disk. The first hard disk microcontroller 12 reads the disk confirmation signal so as to send the clock enable signal to the CPLD 23 of the motherboard 20.

In still another embodiment, when a hard disk is electrically connected with the fourth connection port 184 of the backplane 10, the had disk sends a disk confirmation signal to the second hard disk microcontroller 15. The second hard disk microcontroller 15 reads the disk confirmation signal so as to send the clock enable signal (CLK En) to the second PCIE bus 112 of the backplane 10. When the hard disk is electrically connected with the third connection port 183 of the backplane 10, the second hard disk microcontroller 15 transmits the clock enable signal to the CPLD 23 of the motherboard 20 through the second PCIE bus 112 and the fourth PCIE bus 212 which are electrically connected with each other. The CPLD 23 transmits the clock enable signal to the baseboard management controller 22 through the first GPIO pin 231 and the second GPIO pin 221. The baseboard management controller 22 is configured to transmit the clock enable signal to the basic I/O control chip 25. After reading the clock enable signal, the basic I/O control chip 25 makes the BIOS work, and the options of turning on clock signal and turning off close clock signal are displayed on the RBSU of the BIOS. When the user chooses to turn on the clock signal in the RBSU, the basic I/O control chip 25 sends a first confirmation signal to the CPLD 23, and the CPLD 23 drives the clock chip 24 to send the clock signal to the third connection port 183 according to the first confirmation signal. When the user chooses to turn off the clock signal in the RBSU, the basic I/O control chip 25 sends a second confirmation signal to the CPLD 23, and the CPLD 23 does not drive the clock chip 24 to send the clock signal to the third connection port 183 according to the second confirmation signal.

Figure 4:
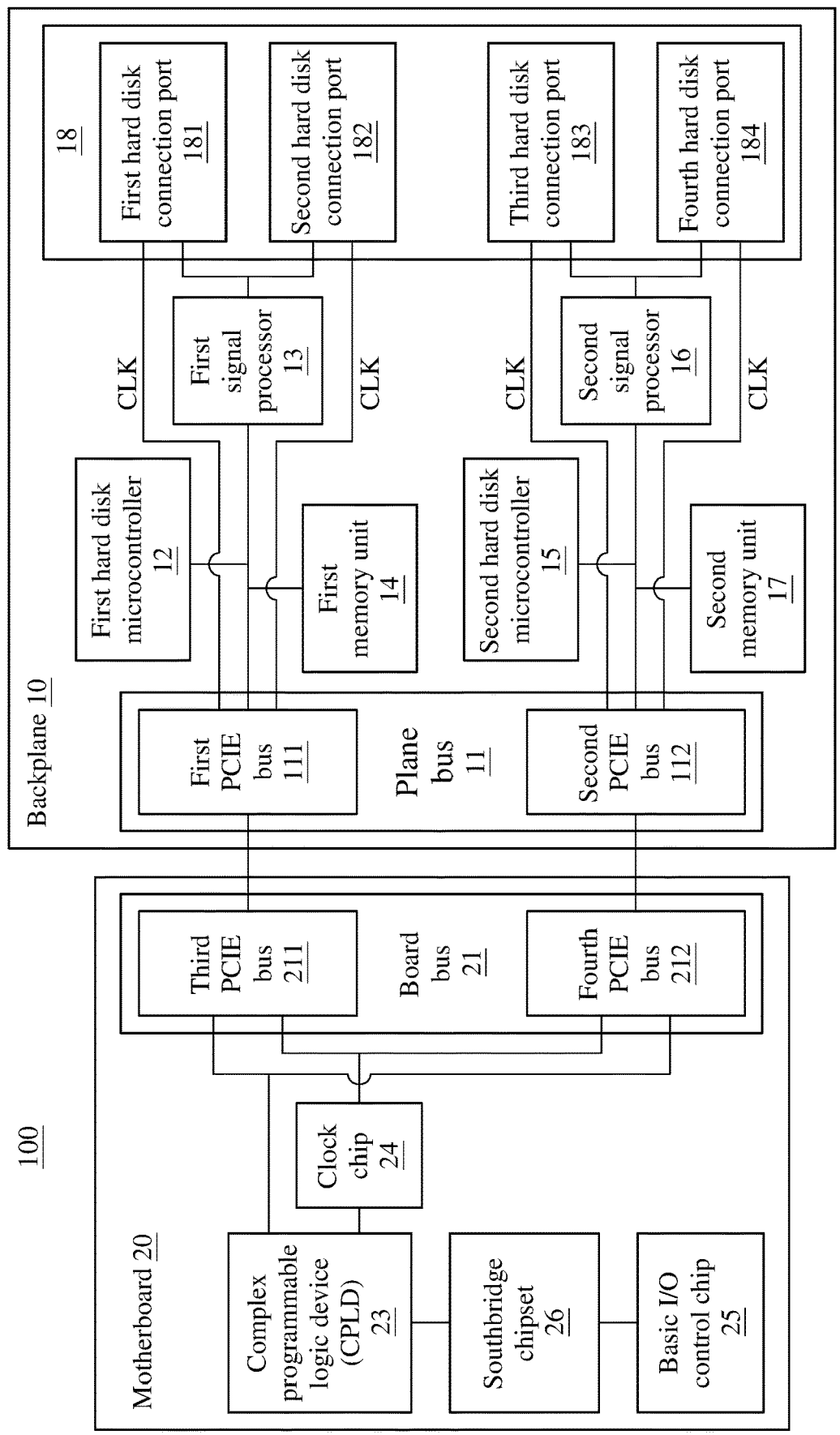
FIG. 4 is a schematic view of a server power saving system according to a second embodiment of the present disclosure.
Figure 5:
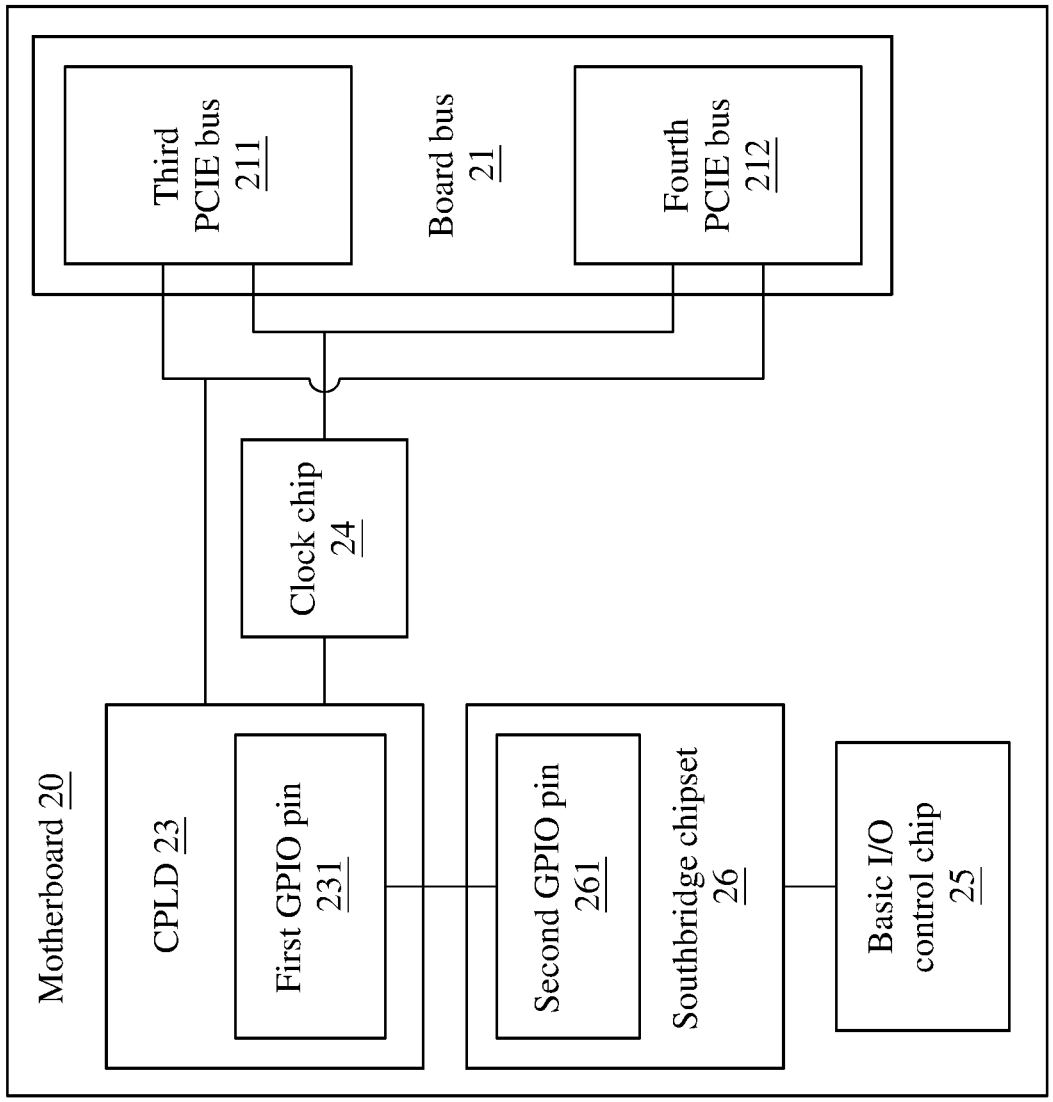
FIG. 5 is a schematic view of a motherboard of the server power saving system in FIG. 4.

FIG. 4 is a schematic view of a server power saving system according to a second embodiment of the present disclosure. FIG. 5 is a schematic view of a motherboard of the server power saving system in FIG. 4. The difference between the second embodiment and the first embodiment is that a motherboard 20 of a server power saving system 100 in this embodiment includes a southbridge chipset 26 rather than a baseboard management controller. The southbridge chipset 26 includes a second GPIO pin 261. The CPLD 23 transmits the clock enable signal to the southbridge chipset 26 through the first GPIO pin 231 and the second GPIO pin 261. The southbridge chipset 26 is configured to transmit the clock enable signal to a basic I/O control chip 25.

Figure 6:
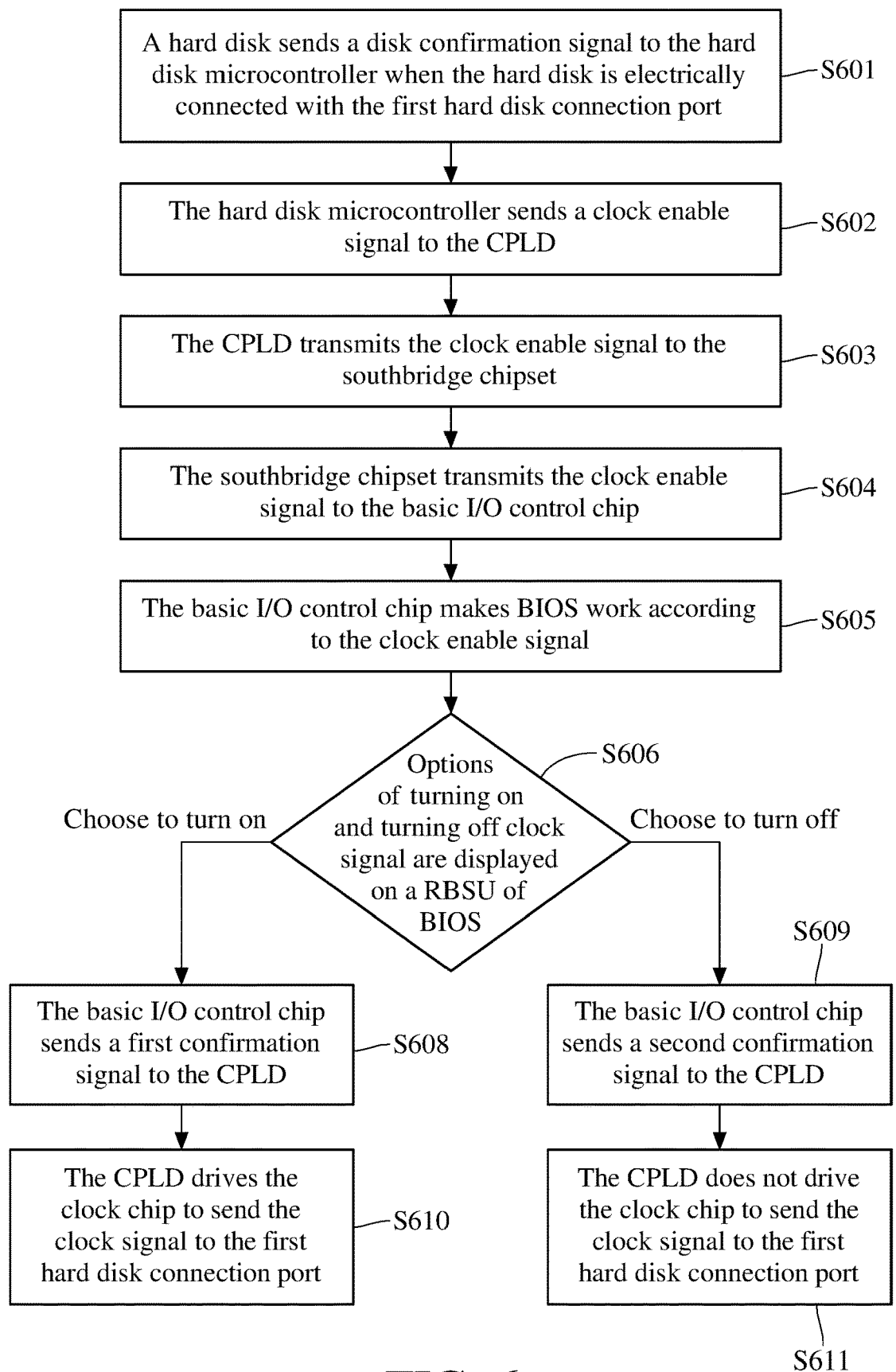
FIG. 6 is a flow chart of a server power saving method performed by the server power saving system in FIG. 4.

FIG. 6 is a flow chart of a server power saving method performed by the server power saving system in FIG. 4. The difference between the second embodiment and the first embodiment is that in a step S603 of a server power saving method in this embodiment, the CPLD 23 transmits the clock enable signal to the southbridge chipset 26 through the first GPIO pin 231 and the second GPIO pin 261. Moreover, in a step S604, the southbridge chipset 26 transmits the clock enable signal to the basic I/O control chip 25.

In a conventional case, the clock enable signal is directly sent to a clock buffer through an enable pin, such that the clock enable signal received by the clock buffer determines whether to output the clock signal, and the output of the clock signal has no relationship with the BIOS in the motherboard; that is, the user is unable to turn on and turn off the clock by the BIOS. According to the disclosure, under few change of the hardware configuration in the server, the user is able to operate the BIOS to control whether the clock chip sends a clock signal to the hard disk connection port of the backplane so as to reduce server power consumption caused by the hard disk, thereby enabling an easier server management for various user requirements.

The foregoing description, for the purpose of explanation, has been described with reference to specific embodiments; however, the embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. A server power saving system, comprising:
a motherboard, comprising:
a complex programmable logic device;
a basic input/output control chip electrically connected with the complex programmable logic device, and the basic input/output control chip comprising a basic input/output control program; and
a clock chip electrically connected with the complex programmable logic device; and
a backplane, comprising:
a hard disk microcontroller electrically connected with the complex programmable logic device; and
a hard disk connection port electrically connected with the hard disk microcontroller and the clock chip;
wherein the hard disk microcontroller sends a clock enable signal to the complex programmable logic device when a hard disk is electrically connected with the hard disk connection port, the complex programmable logic device transmits the clock enable signal to the basic input/output control chip, the basic input/output control chip sends a confirmation signal to the complex programmable logic device according to the clock enable signal, and the complex programmable logic device determines whether to drive the clock chip to send a clock signal to the hard disk connection port according to a content of the confirmation signal.

2. The server power saving system according to claim 1, wherein the motherboard comprises a board bus, the backplane comprises a plane bus, the board bus is electrically and respectively connected with the plane bus and the complex programmable logic device, the plane bus is electrically and respectively connected with the hard disk microcontroller and the hard disk connection port, and the hard disk microcontroller sends the clock enable signal to the complex programmable logic device through the board bus and the plane bus.

3. The server power saving system according to claim 1, wherein the backplane further comprises a signal processing circuit electrically and respectively connected with the plane bus, the hard disk microcontroller and the hard disk connection port.

4. The server power saving system according to claim 1, wherein the motherboard further comprises a chipset electrically and respectively connected with the complex programmable logic device and the basic input/output control chip, and the complex programmable logic device transmits the clock enable signal to the basic input/output control chip through the chipset.

5. The server power saving system according to claim 4, wherein the complex programmable logic device comprises a first general purpose input/output pin, the chipset comprises a second general purpose input/output pin electrically connected with the first general purpose input/output pin, and the clock enable signal is transmitted from the first general purpose input/output pin of the complex programmable logic device to the second general purpose input/output pin of the chipset.

6. The server power saving system according to claim 1, wherein the motherboard further comprises a baseboard management controller electrically and respectively connected with the complex programmable logic device and the basic input/output control chip, and the complex programmable logic device transmits the clock enable signal to the basic input/output control chip through the baseboard management controller.

7. The server power saving system according to claim 6, wherein the complex programmable logic device comprises a first general purpose input/output pin, the baseboard management controller comprises a second general purpose input/output pin electrically connected with the first general purpose input/output pin, and the clock enable signal is transmitted from the first general purpose input/output pin of the complex programmable logic device to the second general purpose input/output pin of the baseboard management controller.

8. A server power saving method, comprising:
    sending a clock enable signal to a complex programmable logic device by a hard disk microcontroller when a hard disk is electrically connected with a hard disk connection port;
    transmitting the clock enable signal to a basic input/output control chip by the complex programmable logic device;
    sending a confirmation signal to the complex programmable logic device by the basic input/output control chip according to the clock enable signal; and
    determining whether to drive the clock chip by the complex programmable logic device to send a clock signal to the hard disk connection port according to a content of the confirmation signal.

9. The server power saving method according to claim 8, wherein transmitting the clock enable signal to the basic input/output control chip by the complex programmable logic device comprises transmitting the clock enable signal to the basic input/output control chip through a chipset.

10. The server power saving method according to claim 8, wherein transmitting the clock enable signal to the basic input/output control chip by the complex programmable logic device comprises transmitting the clock enable signal to the basic input/output control chip through a baseboard management controller.

* * * * *